United States Patent [19]
Botzman
[11] Patent Number: 4,722,380
[45] Date of Patent: Feb. 2, 1988

[54] COATING MATERIAL FOR USE ON SULFUR VULCANIZED RUBBER

[75] Inventors: Thomas J. Botzman, Cuyahoga Falls, Ohio
[73] Assignee: The Goodyear Tire & Rubber Company, Akron, Ohio

[21] Appl. No.: 867,173
[22] Filed: May 27, 1986

Related U.S. Application Data

[60] Division of Ser. No. 799,079, Nov. 15, 1985, Pat. No. 4,668,728, which is a continuation-in-part of Ser. No. 763,387, Aug. 7, 1985, abandoned, which is a continuation of Ser. No. 652,170, Sep. 20, 1984, Pat. No. 4,535,114, which is a division of Ser. No. 620,346, Jun. 13, 1984, Pat. No. 4,515,199.

[51] Int. Cl.[4] ............ B60C 13/00
[52] U.S. Cl. ............ 152/525; 156/116; 428/519
[58] Field of Search ............ 152/524, 525, 158, 520, 152/521; 156/116; 428/519, 195; 427/282, 385.5, 387, 393.5; 524/364, 394, 473, 506; 525/105; 474/91, 271; 198/500, 844

[56] References Cited

U.S. PATENT DOCUMENTS

| | | | |
|---|---|---|---|
| 46,230 | 2/1865 | Fowler | 264/271.1 |
| 1,175,624 | 3/1916 | Fawkes | 428/465 |
| 1,566,566 | 12/1925 | Taylor | 524/467 |
| 1,649,770 | 2/1927 | Miller | 446/220 |
| 1,741,997 | 12/1929 | Lerch | 427/275 |
| 1,784,118 | 12/1930 | Smithers | 152/523 |
| 2,088,561 | 7/1937 | Bagley et al. | 152/524 |
| 2,557,028 | 1/1971 | Turk | 525/211 |
| 2,557,028 | 1/1951 | Smith et al. | 156/62 |
| 2,561,177 | 7/1951 | Barry | 525/105 |
| 2,761,489 | 9/1956 | Kraft | 156/116 |
| 2,821,487 | 1/1958 | Hummel | 427/282 |
| 2,867,603 | 1/1959 | Safford et al. | 525/105 |
| 3,021,292 | 2/1962 | Hurd et al. | 524/506 |
| 3,101,110 | 8/1963 | Vandenburg | 152/153 |
| 3,202,540 | 8/1965 | Stare et al. | 428/319.7 |
| 3,253,634 | 5/1966 | De Young | 152/523 |
| 3,255,141 | 6/1966 | Damm et al. | 524/265 |
| 3,492,370 | 1/1970 | Wirth | 525/211 |
| 3,492,371 | 1/1970 | Barrett | 525/211 |
| 3,594,248 | 7/1971 | Sjoberg | 156/116 |
| 3,595,950 | 7/1971 | Mezynski | 152/525 X |
| 3,607,498 | 9/1971 | Kubota | 156/116 |
| 3,623,900 | 11/1971 | Jonnes et al. | 427/386 |
| 3,629,051 | 12/1971 | Mitchell | 524/441 |
| 3,646,169 | 2/1972 | Wirth | 525/211 |
| 3,653,423 | 4/1972 | Paddock | 152/564 |
| 3,655,598 | 4/1972 | Antonen et al. | 528/15 |
| 3,657,046 | 4/1972 | Furukawa | 156/315 |
| 3,658,639 | 4/1972 | Wirth | 152/564 |
| 3,669,828 | 6/1972 | Usamoto et al. | 428/517 |
| 3,670,055 | 6/1972 | Cameli et al. | 525/192 |
| 3,704,741 | 12/1972 | Turk | 152/525 |
| 3,776,811 | 12/1973 | Eckert et al. | 428/517 |
| 3,914,478 | 10/1975 | Johansson et al. | 427/393.5 |
| 3,969,308 | 7/1976 | Penneck | 523/212 |
| 3,970,133 | 7/1976 | Hopper | 152/525 |
| 3,979,547 | 9/1976 | Roberts, Jr. | 152/525 |
| 4,020,038 | 4/1977 | O'Mahoney | 524/518 |
| 4,136,219 | 1/1979 | Odam et al. | 427/385.5 |
| 4,177,233 | 12/1979 | Roberts, Jr. | 264/134 |
| 4,261,407 | 4/1981 | Vosnick | 152/450 |
| 4,288,356 | 9/1981 | Huebner | 524/501 |
| 4,341,675 | 7/1982 | Nakamura | 524/266 |
| 4,376,184 | 3/1983 | Itoh et al. | 524/492 |
| 4,500,666 | 2/1985 | Wada | 524/232 |
| 4,515,199 | 5/1985 | Kaniecki et al. | 156/116 X |
| 4,617,347 | 10/1986 | D'Sidocky | 525/105 |

FOREIGN PATENT DOCUMENTS

| | | |
|---|---|---|
| 37-1909 | 2/1962 | Japan . |
| 51-36242 | 3/1976 | Japan . |
| 460557 | 1/1937 | United Kingdom . |

*Primary Examiner*—Donald E. Czaja
*Assistant Examiner*—Ramon Hoch
*Attorney, Agent, or Firm*—L. R. Drayer

[57] ABSTRACT

A coloring agent, preferably metallic particles, is disposed in a solution that contains unvulcanized diene rubber(s) and a rubber vulcanization accelerator. Crosslinkable silicone and/or modified EPDM may also be disposed in the solution. The coating material is substantially free of free sulfur, and preferably is also substantially free of carbon black. The accelerator scavenges sulfur from a vulcanized rubber substrate to auto-vulcanize the rubber solids, and any crosslinkable silicone and/or modified EPDM present. Coating materials that do not contain any coloring agent are also disclosed.

8 Claims, No Drawings

COATING MATERIAL FOR USE ON SULFUR VULCANIZED RUBBER

This application is a divisional of application Ser. No. 799,079, filed on Nov. 15, 1985, now U.S. Pat. No. 4,668,728, which was a continuation-in-part of application Ser. No. 763,387 filed on Aug. 7, 1985, now abandoned, which was a continuation of application Ser. No. 652,170 filed Sept. 20, 1984, now U.S. Pat. No. 4,535,114, which was a divisional of application Ser. No. 620,346 filed June 13, 1984, now U.S. Pat. No. 4,515,199.

SUMMARY OF THE INVENTION

There is provided in accordance with one aspect of the invention a liquid coating material for use on a vulcanized rubber article containing free sulfur comprising: a rubber cement that contains unvulcanized diene rubber, the total weight of said rubber being not greater than 10% of the weight of said liquid coating material; 0.1 to 10 phr of a sulfur rubber vulcanization accelerator; and 1 to 500 phr of metallic particles that can pass through a number 325 mesh U.S. Standard Sieve, said liquid coating material being substantially free of carbon black and free sulfur.

There is provided in accordance with another aspect of the invention a liquid coating material for use on a vulcanized rubber article containing free sulfur comprising: (a) a solution comprising, by weight, 5 to 90% toluene, not greater than 40% acetone, not greater than 25% chlorinated solvent, and not greater than 90% gasoline; (b) unvulcanized diene rubber dissolved in said solution, the total weight of said rubber being not greater than 10% of the weight of said liquid coating material; (c) 0.1 to 10 phr of a sulfur rubber vulcanization accelerator; and (d) 1 to 500 phr of metallic particles that can pass through a number 325 mesh U.S. Standard Sieve, said liquid coating material being substantially free of carbon black and free sulfur.

There is provided in accordance with another aspect of the invention a liquid coating material for use on a vulcanized rubber article containing free sulfur comprising: (a) an organic solvent; and (b) a compound dissolved in said solvent, said compound comprising unvulcanized diene rubber, at least one other material selected from a crosslinkable silicone and a modified EPDM, and at least one rubber vulcanization accelerator, said liquid coating material being substantially free of free sulfur. A liquid coating material according to this aspect of the invention preferably further comprises a coloring agent and is substantially free of carbon black.

There is provided in accordance with yet another aspect of the invention an article of manufacture comprising an article having at least an outer layer of vulcanized rubber containing free sulfur, at least a portion of said outer layer having a coating of a coating material thereon, said coating material comprising a vulcanized matrix comprising a diene rubber and at least one other material selected from a crosslinkable silicone and a modified EPDM. Preferably said matrix further comprises a coloring agent. An article in accordance with this aspect of the invention more specifically may comprise a tire with sidewall portions having an axially outer layer of vulcanized rubber containing free sulfur with said coating thereon.

BACKGROUND OF THE INVENTION

This invention relates to coating materials that can be used on sulfur vulcanized rubber articles such as tires and hoses, and to sulfur vulcanized articles that have indicia or a protective coating applied thereon with this new coating material.

The marking of indicia or ornamental designs on prevulcanized rubber articles with a coating material, such as paint, has been felt to be desirable to a long time. For instance, U.S. Pat. Nos. 1,741,997 and 1,784,118, both issued in 1928, taught the use of colored rubber cements for making ornamental designs on tire sidewalls. U.S. Pat. Nos. 2,088,561, issued in 1937, taught a "liquid tire cover" that was essentially a paint applied to a preformed tire. However, as pointed out at column 1, lines 65 to 73 of U.S. Pat. No. 3,623,900, issued in 1971: "These suggestions have never lead to satisfactory tires, principally because the materials suggested as the rubber cement or rubber solution were inadequate to provide colored sidewall facings of the necessary adhesion to the rest of the vulcanized tire and durability. After a period of time, a tire sidewall facing applied according to the teaching of these prior suggestions cracked and delaminated from the tire."

Various other materials that have been proposed for use as coatings on vulcanized rubber articles include epoxy systems (U.S. Pat. No. 3,623,900 issued in 1971), fluorescent paint (U.S. Pat. No. 3,607,498 issued in 1971), polyurethane (U.S. Pat. Nos. 3,979,547 issued in 1976 and 4,136,219 issued in 1979), and slip coatings containing silicone gum (U.S. Pat. No. 3,202,540 issued in 1965).

DETAILED DESCRIPTION OF THE INVENTION

Tires, hoses, balls, conveyor belts and other articles of manufacture that comprise vulcanized rubber are often subject to flexing, twisting, or other manners of distortion during their useful lives. Furthermore, such articles may be subjected to extreme climatic conditions and aging processes due to chemical reactions of the vulcanized rubber with the atmosphere. The problem of providing a coating material for marking indicia or ornamental designs on already vulcanized rubber articles has been a challenge to those persons working in the rubber industry for many years, as evidenced by the patents cited in the preceding text.

The liquid coating material, or paint, of the present invention reacts with a vulcanized rubber substrate containing free sulfur to provide a coating containing a coloring agent, preferably metallic particles, actually embedded in vulcanized rubber that is superposed on the surface of the substrate. As used herein, "free sulfur" refers to sulfur in a zero valence state that is not involved in the vulcanization of rubber in a substrate or a coating material. While it its believed that the metallic particles will not be readily ejected from the surface of an article due to distortion of the article, it is an advantage of the present invention that the coating can be touched up without requiring the use of any special vulcanizing equipment. As used herein, "auto-vulcanizing" and "auto-vulcanized" refer to the vulcanization of rubber through a sulfur vulcanization accelerator or ultra-accelerator at the ambient temperature, which is accomplished by scavenging the free sulfur from a substrate. That is to say, if a person owns a tire with a stripe painted on the sidewall with the new coating material he can touch up a portion of the stripe that has been accidentally abraded against a curb by merely brushing on some more liquid coating material right in his own driveway and then allowing the rubber in the coating material to be auto-vulcanized.

It is believed that the coating material of this invention is utilitarian because it utilizes the free sulfur contained in nearly all sulfur vulcanized rubber articles by allowing it to be diffused or scavenged into the coating material where the vulcanization accelerator in the coating material facilitates the auto-vulcanization of the diene rubber, and in some embodiments crosslinkable silicone and/or modified EPDM, in the coating material to form a matrix adhered to both the vulcanized rubber substrate and the metallic particles in the coating. It is understood that the solvent in which the diene rubber, and in some embodiments crosslinkable silicone and/or modified EPDM, is dissolved will be disposed of basically by evaporation into the atmosphere.

In the Examples disclosed herein various solvents are used in combination to provide an organic solvent, and it is understood that, in each instance, these combinations are preferred to improve solution and control of the drying of the liquid coating material. It is understood that single solvents, or any other suitable combination of solvents, may be used, although, in some instances, the coating and drying characteristics are not as easily controlled.

The following examples illustrate embodiments of the new coating materials.

EXAMPLE I

Fine metal powder, for example Gold #34 commercially available from the Leo Uhlfelder Co. of Mount Vernon, N.Y., was mixed into a commercially available fast drying self-vulcanizing rubber cement, for example Patch Rubber Company stock number 16-451. After thoroughly agitating the mixture to dispense the metallic particles, the liquid coating material was brushed onto a clean dry surface of a rubber tire sidewall.

The rubber cement contained about 5½% of unvulcanized polyisoprene rubber solids by weight, along with a rubber vulcanization accelerator.

A liquid coating material according to any embodiment of the present invention must be substantially free of free sulfur. "Substantially free of free sulfur" is understood to mean a free sulfur content of not greater than 0.1 phr. This is a critical feature of the invention because a higher free sulfur content may cause significant vulcanization of the diene rubber and reduce the shelf life and/or reduce the viscosity of the liquid coating material to an unacceptable level. It is preferred that the unvulcanized diene rubber in the coating material according to any of the embodiments disclosed herein be selected from the group consisting of cis 1,4 polyisoprene rubber (either natural or synthetic), polybutadiene rubber, and styrene/butadiene copolymer rubber. Most preferably, the rubber solids in the coating material are natural rubber, but it is understood that any of the aforementioned rubbers or a combination of them can be used in the coating material. The reason for using these particular rubbers is that when vulcanized they will have physical characteristics that most nearly correspond to those of an underlying vulcanized rubber substrate. The coating material of the invention should also be substantially free of carbon black which would detract from the desired color of the coating material. As used herein, the coating material is substantially free of carbon black if it contains less than 0.1 phr of carbon black. However; if a coating material according to the embodiments disclosed in any of Examples III, IV or V is to be used merely for protective purposes as explained later, the coating material could contain carbon black since it would not be detrimental in appearance.

The size of the metallic particles is felt to be critical to the invention because if the particles are too large much of their bulk will protrude from the vulcanized rubber layer of the coating and they will be too readily ejected during deformation of the coated article. Optimally, to accommodate sulfur diffusion, the layer of liquid coating material applied to the vulcanized rubber surface should have a thickness of between about 0.0254 mm (0.001 in.) and 0.0508 mm (0.002 in.), so the preferred size of the metallic particles is such that the particles can pass through a number 325 mesh U.S. Standard Sieve. It is understood that a number 325 mesh U.S. Standard Sieve comprises 127 meshes per linear cm. (323 meshes per linear in.), and has sieve openings of 0.044 mm (0.0017 in.). The metallic particles are a particulate when the coating material is in a liquid state. Most preferably, the metallic particles are in the form of flakes. For the purpose of this invention, a "flake" is a particle having two or more substantially flat opposing sides. Flakes are more preferable than spheres because they present a greater surface area for adherence to the auto-vulcanized rubber matrix of the coating. It is understood that "metallic" refers not only to pure metallic elements, but also to any alloy, which is a combination of two or more metals or of one or more metals with certain other elements for example forming the oxides of a metal, that will impart a desired color to the coating material. Of course, the volume of metallic particles in the coating material will depend on the exact finish of the coated surface that is desired, but it is preferable that the metallic particles comprise not greater than 25% of the volume of a coating comprised of the new material in order to maintain adequate adherence to the auto-vulcanized rubber matrix. Put another way, the coating material should contain 1 to 500 parts per hundred rubber (phr), preferably 10 to 100 phr of metallic particles.

EXAMPLE II

Silver coating material for use on sulfur vulcanized rubbers was prepared according to the following procedure.

1. A solution was prepared at room temperature comprising 53% toluene, 14% acetone, 3% trichloroethane and 30% deodorized gasoline. The trichloroethane may be replaced by any chlorinated solvent, such as trichloroethylene. The deodorized gasoline, commonly referred to in the rubber industry as rubber naphtha, may be replaced by any material similar to the commonly used grades of gasoline.

2. Powdered substantially sulfur free natural rubber was dissolved in the solution prepared in step 1 at 3% by weight. Hot rubber cut from a mill may be used instead of powdered rubber. It is understood that any of the rubbers contained in the group set forth above may be used in the coating material. While the percentage of unvulcanized diene rubber, or in the embodiments disclosed in Examples III, IV and V the total percentage of all of the dissolved compound, in the liquid coating material should not exceed 10% by weight, it more preferably does not exceed 6% and most preferably does not exceed 3%. This limitation is desirable because at concentrations of greater than 10% the liquid coating material becomes very thick and gives a streaked appearance after it dries, while lower concentrations give more favorable results.

3. Tetramethylthiuram disulfide (TMTD) at 0.3 parts by weight rubber was added to the mixture produced in step 3. TMTD is a rubber sulfur vulcanization accelerator, and may be replaced in any of the disclosed embodiments by an appropriate amount of another accelerator, or combination of accelerators, selected for example from the following classes: Amines, Guanidines, Thioureas, Dithiocarbamates, Thiurams, Sulfenamides, and Thiazoles. It is understood, however, that an excess of accelerator is preferred to underacceleration.

4. Aluminum metallic particles, purchasable from the Leo Uhlfelder Co. of Mount Vernon, N.Y., and labeled as "Superlative Chrome Aluminum Lining", was added to the mixture produced in step 3 at slightly less than 1% by weight. The metallic particles used were a "400 mesh powder" and 100% of the particles passed through a number 325 mesh American Standard Sieve. It is understood that the metallic particles may be selected in accordance with the desired appearance of the coating material after application.

The proportions of the contents of the solution mixed in step one may vary widely depending upon the selected method of coating material application and the desired drying time for the coating material. The ranges are: toluene 5 to 90%; acetone less than 40%; chlorinated solvent less than 25%; and mixed hydrocarbons (gasoline) less than 90%, by weight. More preferably the ranges are: 50 to 55% toluene; 12 to 16% acetone; 1 to 5% chlorinated solvent, and 25 to 35% gasoline.

EXAMPLE III

A liquid coating material that provides not only the advantages obtainable with the recipes disclosed in Examples I and II, but also provides an increased resistance to ozone cracking and increased lubricity, which enhances cleanability, of the coating material after it has been applied to a rubber article and allowed to atuo-vulcanize is disclosed in this example. In this example all parts are by weight.

1. 100 parts natural rubber and 10 parts crosslinkable silicone were mixed on a mill until well dispersed.

2. 2 parts zinc dimethyldithiocarbamate and 1 part tetramethylthiuram disulfide were mixed with the product of step 1 until well dispersed.

3. The solvent of step 2 was dissolved in an organic solvent comprising, by volume, 60% to 80% rubber naphtha, 15% to 30% toluene, and 1% to 3% 1,1,1 trichloroethane. The product of step 2 comprising not more than 10% of the total weight of the liquid coating material.

As disclosed in Example I any diene rubber, or combination thereof, may be substituted for the natural rubber used in step 1. The amount of diene rubber(s) should be in the range of 60 to 130 parts by weight, preferably 90 to 110 parts by weight. The amount of crosslinkable silicone should be in the range of 5 to 100 parts by weight, preferably 5 to 20 parts by weight. If desired up to 25 parts, preferably no more than 10 parts, of zinc stearate could be included in the mixture during step 2, in order to provide a combination of organic and inorganic vulcanization accelerators. However; as pointed out in Example II, any suitable vulcanization accelerator, or combination of accelerators, can be used.

As used herein and in the appended claims the term "crosslinkable silicone" refers to a sulfur curable silicone rubber which is crosslinkable with a diene rubber. One example of a crosslinkable silicone, which was used in this example and Example V, comprises the reaction product of (a) a silicone rubber which contains pendent vinyl groups and (b) an N-chlorothio-sulfonamide having the structural formula

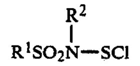

where $R^1$ and $R^2$ are selected from the group consisting of alkyl radicals having 1-20 carbon atoms, aralkyl radicals having 7-20 carbon atoms, alkaryl radicals having from 7-20 carbon atoms, and haloaryl radicals having 6-10 carbon atoms and where $R^1$ is also selected from radicals having the formula

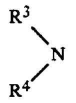

where $R^3$ and $R^4$ are individually selected from said alkyl, aralkyl, and haloaryl radicals and where $R^3$ and $R^4$ can be joined together to represent radicals selected from $-CH_2-_n$, where n is an integer from 4 to 7, and $-(CH_2)_x O-(CH_2)_x$ wherein x is an integer from 2 to 6. The manufacture of such a crosslinkable silicone is taught in commonly assigned U.S. Pat. No. 4,617,347, issued Oct. 14, 1986, which is incorporated by reference herein for the purpose of teaching a method of manufacturing a crosslinkable silicone.

A liquid coating material according to the embodiments disclosed in this Example have utility due to their ozone resisting and lubricity properties, for example as a lubricating coating on power transmission or conveyor belts, rubber bearings, tire runflat devices, tire curing bladders, windshield wiper blades, or sealing gaskets. However; they also can be used to form indicia on, or simply to color to, any vulcanized rubber article having at least a surface layer containing free sulfur by adding a coloring agent to the coating material. While any coloring agent, such as a dye, could be used in these embodiments, preferably to coloring agent comprises metallic particles of the type and amounts disclosed in the preceding examples.

EXAMPLE IV

A liquid coating material that provides not only the advantages obtainable with Examples I and II, but also provides an increased resistance to ozone cracking of the coating material after it has been applied to a rubber article and allowed to auto-vulcanize is disclosed in this example. In this example all parts are by weight.

1. 70 parts natural rubber and 30 parts modified EPDM were mixed on a mill until well dispersed.

2. 2 parts zinc dimethyldithiocarbamate, and 1 part tetramethylthiuram dilsulfide were mixed with the product of step 1 until well dispersed.

3. The product of step 2 was dissolved in an organic solvent comprising, by volume, 60% to 80% rubber naphtha, 15% to 30% toluene, and 1% to 3% 1,1,1 trichloroethane, by volume. The product of step 2 comprising not more than 10% of the total weight of the liquid coating material.

As disclosed in Example I any diene rubber, or combination thereof, may be substituted for the natural rubber used in step 1. The amount of diene rubber(s) should be in the range of 30 to 90 parts by weight, preferably 60 to 90 parts by weight. The amount of modified EPDM should be in the range of 10 to 80 parts by weight, preferably 20 to 60 parts by weight. If desired up to 25 parts, preferably no more than 10 parts, of zinc stearate could be included in the mixture during step 2, in order to provide a combination of organic and inorganic vulcanization accelerators. However; as pointed out in Example II, any suitable vulcanization accelerator, or combination of accelerators, can be used.

As used herein and in the appended claims the term "modified EPDM" (ethylene-propylene-diene monomer) refers to a rubber terpolymer that has been modified to be crosslinkable to a diene rubber. One example of modified EDPM, which was used in this example and in Example V is a chlorothio-sulfonamide-modified rubbery terpolymer, the manufacture of which is taught in U.S. Pat. No. 3,970,133, which is incorporated herein for the purpose of teaching a method of manufacturing modified EPDM. The specific modified EPDM used in this example, and in the following Example V is taught in Example XVII of U.S. Pat. No. 3,970,133.

A liquid coating material according to the embodiments disclosed in this example have utility due to their ozone resisting properties, for example as a coating on the sidewall of a tire. However; they also can be used to form indicia on, or simply to add color to, any vulcanized rubber article having at least a surface layer containing free sulfur by adding a coloring agent to the coating material. While any coloring agent, such as a dye, could be used in these embodiments, preferably the coloring agent comprises metallic particles of the type and amounts disclosed in the preceding examples.

EXAMPLE V

The most preferred embodiment of a liquid coating material of the present invention is a liquid coating material that contains both modified EPDM and crosslinkable silicone.

1. 1200 g of natural rubber, 500 g of modified EPDM and 1800 g of titanium dioxide (RCL-9 obtained from Glidden SCM) were mixed on a mill until well dispersed.

2. 200 g of the masterbatch from step 1 was mixed with 3 g zinc dimethyldithiocarbamate, 2 g tetramethylthiuram disulfide, and 5 g zinc stearate, until the ingredients were well dispersed.

3. The product of step 2 was dissolved in 2,050 ml of an organic solvent comprising a mixture of 1,500 ml rubber naphtha, 500 ml toluene and 40 ml 1,1,1 trichloroethane, and 10 ml of a solution comprising 40% crosslinkable silicone by weight dissolved in rubber naphtha.

As disclosed in Example I any diene rubber, or combination thereof, may be substituted for the natural rubber used in step 1. The amount of diene rubber(s) should be in the range of 40 to 90 parts by weight, preferably 65 to 75 parts by weight. The amount of modified EPDM should be in the range of 10 to 60 parts by weight, preferably 25 to 35 parts by weight. The amount of crosslinkable silicone should be in the range of 0.1 to 20 phr, preferably 2 to 7 phr. As already pointed out in the previous examples, any suitable vulcanization accelerator, or combination of accelerators, can be used in a coating material according to this embodiment.

A liquid coating material according to the embodiments disclosed in this example have utility even without any coloring agent, inasmuch as they possess to some extent the properties of the embodiments taught in both Examples III and IV, and could be used in the manners set forth by way of example therein. The limitations regarding coloring agents for the embodiments disclosed in the other examples apply equally to the the preferred embodiment disclosed in present example.

The vulcanized rubber surface that is to be coated should be clean and dry. It is advantageous to prewash the surface with a solution similar to that manufactured in step 1 of Example 2. The liquid coating material should be well agitated before application because the metallic particles are in suspension and may settle during storage of the liquid coating material. The liquid coating material may be applied by brushing, spraying, rolling, dipping, or any other suitable means, at about room temperature.

In accordance with another embodiment of the invention a method of manufacturing an article comprises the steps of: (a) providing an article comprising at least an outer layer of vulcanized rubber containing free sulfur therein; (b) applying a coating between 0.001 and 0.010 inches (between 0.025 mm and 0.25 mm) thick, preferably between 0.001 and 0.002 inches (between 0.025 mm and 0.050 mm) thick, of a liquid coating material in accordance with the invention disclosed herein to a surface of said vulcanized rubber; and (c) allowing the diene rubber (and any crosslinkable silicone and/or modified EPDM) in the coating material to be auto-vulcanized. An article manufactured in accordance with this process is also understood to be an embodiment of the present invention. Examples of such articles are rubber tires having indicia or ornamental designs applied to one or both sidewalls.

An article of manufacture having at least an outer layer of vulcanized rubber containing free sulfur, having a coating of a coating material thereon as described in the immediately preceeding paragraph, with said coating material being according to any of the embodiments disclosed herein is understood to be a part of the present invention. In the case of a tire having a tread portion and a pair of sidewall portions extending radially inwardly therefrom, the sidewall portions having at least an axially outer layer of vulcanized rubber containing free sulfur, the coating on a sidewall is preferably disposed either in a depressed area, or is surrounded by a ridge in order to reduce abrasion of the coating against curbs or other objects. Most preferably the portion(s) of the sidewall coated to form indicia are disposed at least one-tenth (1/10) inch inwardly of the surrounding portion of the sidewall or the protective ridge.

For best results the vulcanizied rubber substrate to which the coating material is applied should not contain any free staining materials (e.g. aromatic oils or antiozonants), or any material which discolors upon oxidation or ozonation. Such a compound is referred to in the tire art as a "non-staining compound". This is important because if such materials are present in the substrate they will discolor the coating material.

It will be apparent that changes and modifications may be made in the invention by those skilled in the art without deviating from the scope of the invention.

What is claimed is:

1. An article of manufacture comprising an article having at least an outer layer of vulcanized rubber containing free sulfur, at least a portion of said outer layer having thereon a coating between 0.001 and 0.010 inches thick of a coating material, said coating material comprising a vulcanized matrix of 40 to 90 parts by weight of diene rubber, 10 to 60 parts by weight of modified EPDM, and 0.1 to 20 phr of crosslinkable silicone, said coating material being substantially free of carbon black and further comprises metallic particles as a coloring agent.

2. An article of manufacture according to claim 1 wherein the modified EPDM is a chlorothio-sulfonamide-modified rubbery terpolymer.

3. An article of manufacture according to claim 1 wherein said crosslinkable silicone comprises the reaction product of (a) a silicone rubber which contains pendent vinyl groups and (b) an N-chlorothio-sulfonamide having the structural formula

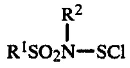

where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

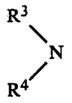

where $R^3$ and $R^4$ are individually selected from said alkyl, aralkyl and haloaryl radicals and where $R^3$ and $R^4$ can be joined together to represent radicals selected from $—CH_2—_n$, where n is an integer from 4 to 7, and $-(CH_2)_x-O-(CH_2)_x-$ wherein x is an integer from 2 to 6.

4. An article of manufacture according to claim 2 wherein said crosslinkable silicone comprises the reaction product of (a) a silicone rubber which contains pendent vinyl groups and (b) an N-chlorothio-sulfonamide having the structural formula

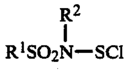

where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

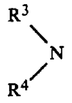

where $R^3$ and $R^4$ are individually selected from said alkyl, aralkyl and haloaryl radicals and where $R^3$ and $R^4$ can be joined together to represent radicals selected from $—CH_2—_n$, where n is an integer from 4 to 7, and $-(CH_2)_xO-(CH_2)_x-$ wherein x is an integer from 2 to 6.

5. A tire comprising a tread portion and a pair of sidewall portions extending radially inwardly from said tread portion, said sidewall portions having at least an axially outer layer of vulcanized rubber containing free sulfur, the outer layer of one of said sidewall portions having indicia thereon comprising a coating between 0.001 and 0.010 inches thick of a coating material comprising a vulcanized matrix of 60 to 80 parts by weight diene rubber, 20 to 40 parts by weight modified EPDM, 2 to 10 phr of crosslinkable silicone, and a coloring agent comprising 1 to 500 phr of metallic particles that can pass through a number 325 U.S. Standard Sieve, said coating material being substantially free of carbon black.

6. A tire comprising a tread portion and a pair of sidewall portions extending radially inwardly from said tread portion, said sidewall portions having at least an axially outer layer of vulcanized rubber containing free sulfur, the outer layer of one of said sidewall portions having indicia thereon comprising a coating between 0.001 and 0.010 inches thick of a coating material comprising a vulcanized matrix of 65 to 75 parts by weight natural rubber, 25 to 35 parts by weight modified EPDM, 2 to 7 phr crosslinkable silicone, and a coloring agent comprising 1 to 500 phr of titanium dioxide, said coating material being substantially free of carbon black.

7. A tire according to claim 6 wherein said modified EPDM is a chlorothio-sulfonamide-modified rubbery terpolymer.

8. A tire material according to claim 6 wherein said crosslinkable silicone comprises the reaction product of (a) a silicone rubber which contains pendent vinyl groups and (b) an N-chlorothio-sulfonamide having the structural formula

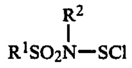

where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

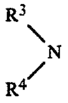

where $R^3$ and $R^4$ are individually selected from said alkyl, aralkyl, and haloaryl radicals and where $R^3$ and $R^4$ can be joined together to represent radicals selected from $—CH_2—_n$, where n is an integer from 4 to 7, and $-(CH_2)_xO-(CH_2)_x-$ wherein x is an integer from 2 to 6.

* * * * *